(12) United States Patent
Park et al.

(10) Patent No.: US 9,348,112 B2
(45) Date of Patent: May 24, 2016

(54) OPTICAL SYSTEM

(71) Applicant: Samsung Electro-Mechanics Co., Ltd., Gyeonggi-do (KR)

(72) Inventors: Il Yong Park, Suwon-si (KR); Jin Hwa Jung, Suwon-si (KR); Young Suk Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/018,308

(22) Filed: Sep. 4, 2013

(65) Prior Publication Data
US 2014/0063618 A1 Mar. 6, 2014

(30) Foreign Application Priority Data

Sep. 5, 2012 (KR) .................. 10-2012-0098210
Jun. 25, 2013 (KR) .................. 10-2013-0072835

(51) Int. Cl.
*G02B 13/18* (2006.01)
*G02B 13/00* (2006.01)

(52) U.S. Cl.
CPC ........ *G02B 13/0045* (2013.01); *G02B 13/0015* (2013.01); *G02B 13/18* (2013.01)

(58) Field of Classification Search
CPC ....... G02B 13/0045; G02B 13/18; G02B 9/62
USPC .......................................... 359/713, 756, 757
See application file for complete search history.

(56) References Cited

U.S. PATENT DOCUMENTS

| | | | | |
|---|---|---|---|---|
| 5,699,202 A | * | 12/1997 | Yamamoto | ................... 359/754 |
| 5,831,770 A | * | 11/1998 | Matsuzawa | ............ G02B 13/14 |
| | | | | 355/53 |
| 6,104,544 A | * | 8/2000 | Matsuzawa | .............. G02B 9/62 |
| | | | | 359/649 |
| 2012/0262806 A1 | * | 10/2012 | Huang | ........................ 359/784 |
| 2013/0003193 A1 | * | 1/2013 | Huang | ............... G02B 13/0045 |
| | | | | 359/713 |

FOREIGN PATENT DOCUMENTS

| | | | |
|---|---|---|---|
| KR | 10-2009-0106242 A | | 10/2009 |
| KR | 10-2010-0040357 A | | 4/2010 |
| KR | 10-2011-0024872 A | | 3/2011 |

\* cited by examiner

*Primary Examiner* — Scott J Sugarman
(74) *Attorney, Agent, or Firm* — NSIP Law

(57) ABSTRACT

The present invention relates to an optical system.
An optical system of the present invention includes a first lens having a positive refractive power and an object-side surface convex toward an object side; a second lens having a negative refractive power and an image-side surface concave toward an image side; a third lens having a negative refractive power; a fourth lens having a positive refractive power; a fifth lens having a positive refractive power and an image-side surface convex toward the image side; and a six lens having a negative refractive power and an image-side surface concave toward the image side.

13 Claims, 5 Drawing Sheets

OPTICAL SYSTEM

CROSS-REFERENCE TO RELATED APPLICATIONS

Claim and incorporate by reference domestic priority application and foreign priority application as follows:

CROSS REFERENCE TO RELATED APPLICATION

This application claims the benefit under 35 U.S.C. Section 119 of Korean Patent Application Serial Nos. 10-2012-0098210 and 10-2013-0072835, entitled filed Sep. 5, 2012 and Jun. 25, 2013, which are hereby incorporated by reference in their entirety into this application.

BACKGROUND OF THE INVENTION

1. Field of the Invention

The present invention relates to an optical system, and more particularly, to an optical system that consists of six lenses.

2. Description of the Related Art

In general, mobile communication means such as mobile communication terminals, PDA, and smartphones become to have various additional functions in addition to basic communication functions along with their increased use and diversification of services provided through communication technology.

In particular, camera modules mounted to the mobile communication means are in increasing demand as various convergence devices for high definition video shooting, automatic focus adjustment, and QR code recognition in addition to simple photo shooting using a single focus.

Further, as the size of the camera modules is gradually reduced, higher resolution is required, and manufacturing costs of the camera modules are gradually reduced along with price cuts of the mobile communication devices.

In order to reduce the unit price of the camera module, first, it is most preferred to reduce manufacturing costs of lens groups constituting an optical system embedded in the camera module. However, in order to satisfy the above-mentioned conditions on improvement of resolution, the optical system should be constituted by applying a glass lens having high optical performance, but it is impossible to reduce the manufacturing costs of the camera module by using several sheets of expensive glass lenses.

Further, when employing a plurality of glass lenses to overcome the resolution problem, it is impossible to reduce a weight of the optical system.

RELATED ART DOCUMENT

Patent Document

Patent Document 1: Korean Patent Laid-open Publication No. 2009-106242

SUMMARY OF THE INVENTION

Therefore, the present invention has been invented in order to overcome the above-described disadvantages and problems raised in a conventional mobile camera optical system and it is, therefore, an object of the present invention to provide an optical system that can implement high resolution by configuring an optical system using six aspherical plastic lenses.

In accordance with one aspect of the present invention to achieve the object, there is provided an optical system including: a first lens having a positive refractive power and an object-side surface convex toward an object side; a second lens having a negative refractive power and an image-side surface concave toward an image side; a third lens having a negative refractive power; a fourth lens having a positive refractive power; a fifth lens having a positive refractive power and an image-side surface convex toward the image side; and a six lens having a negative refractive power and an image-side surface concave toward the image side.

Further, the optical system satisfies the following Conditional Expression with respect to conditions on aberration correction and compact design.

$$0.5 < F1/F < 1.2 \qquad \text{[Conditional Expression]}$$

Here, F is a focal length of the entire optical system, and F1 is a focal length of the first lens.

Further, the optical system satisfies the following Conditional Expression with respect to conditions on chromatic aberration.

$$V1 - V2 > 25 \qquad \text{[Conditional Expression]}$$

Here, V1 is an Abbe number of the first lens, and V2 is an Abbe number of the second lens.

And the first to sixth lenses may be plastic lenses, and both surfaces of the first to sixth lenses may be aspherical surfaces.

Further, an optical filter, which is formed of a cover glass coated with an infrared cut filter for blocking excessive infrared rays included in light introduced from the outside, may be further included between the six lens and an image plane.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

A matter regarding to an operation effect including a technical configuration for an object of an optical system in accordance with the present invention to achieve the object will be clearly appreciated through the following detailed description with reference to the accompanying drawings illustrating preferable embodiments of the present invention.

However, in the following lens configuration diagram of each embodiment, the thickness, size, and shape of lenses may be somewhat exaggerated for detailed description of the present invention. Particularly, the shape of a spherical surface or an aspherical surface shown in the lens configuration diagram is shown as an example and not limited thereto.

Figure 1:
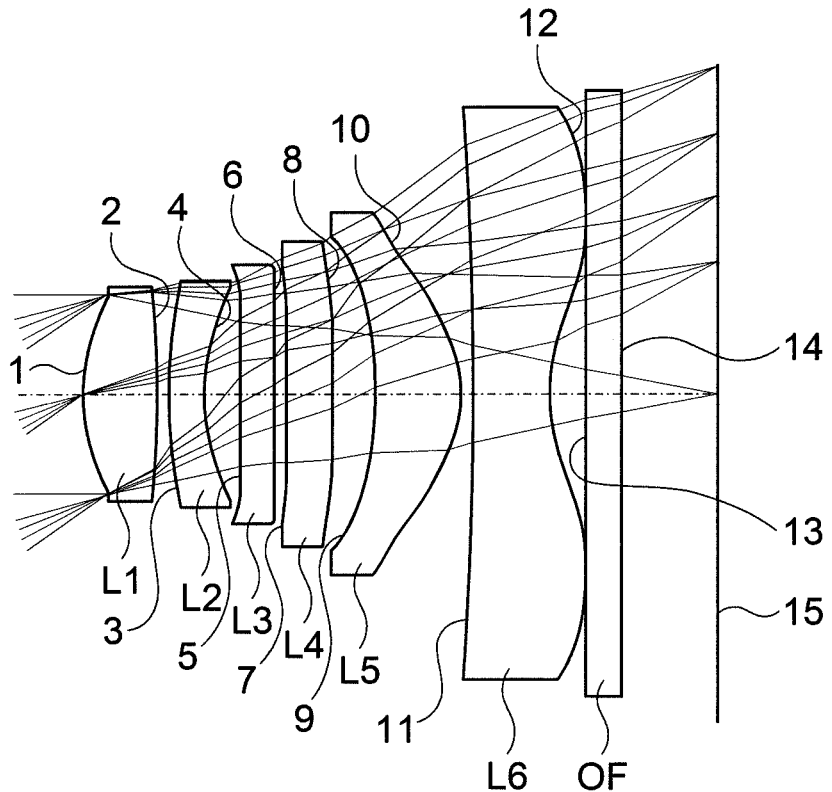
FIG. 1 is a configuration diagram showing lens arrangement of an optical system for cameras in accordance with a first embodiment of the present invention.

First, FIG. 1 is a lens configuration diagram showing a first embodiment of an optical system in accordance with the present invention. As shown, an optical system of the present embodiment includes a first lens L1 having a positive refractive power, a second lens L2 having a negative refractive power, a third lens L3 having a negative refractive power, a fourth lens L4 having a positive refractive power, a fifth lens L5 having a positive refractive power, and a sixth lens L6 having a negative refractive power.

At this time, the first lens L1 may have a shape in which an object-side surface is convex toward an object side, and the second lens L2 may have a shape in which an image-side surface is concave toward an image side.

Further, the third lens L3 may have a meniscus shape in which an object-side surface is concave, the fifth lens L5 may have a shape in which an image-side surface is convex toward the image side, and the sixth lens L6 may have a shape in which an image-side surface is concave toward the image side.

Further, an optical filter OF, which is formed of an infrared filter for blocking excessive infrared rays included in light passing through the optical system or a cover glass coated with the infrared filter, may be provided between the sixth lens L6 and an image plane 15.

Further, in the optical system of the present invention, all of the first to sixth lenses L1 to L6 may be plastic lenses, and one or both surfaces of the first to sixth lenses L1 to L6 may be aspherical surfaces.

The reason for forming at least one surface of the lenses, which constitute the optical system in accordance with the present invention, as an aspherical surface is to improve the degree of freedom in design for facilitating correction of aberration including chromatic aberration and mitigating manufacturing tolerances. Further, the reason for forming all of the first to sixth lens L1 to L6 with plastic lenses is to configure an optical system that can be used in mobile devices by achieving a light weight due to characteristics of the optical system having easiness in manufacture of aspherical surfaces compared to glass lenses and mainly mounted to the mobile devices.

Meanwhile, as mentioned above, the optical system of the present invention can perform aberration correction and achieve miniaturization while using a plurality of lenses by the following Conditional Expressions 1 and 2. Conditional Expressions and operational effects will be described below.

$$0.5 < F1/F < 1.2 \qquad \text{[Conditional Expression 1]}$$

Here, F1 is a focal length of the first lens, and F is a focal length of the entire optical system.

Conditional Expression 1, which is a condition on aberration correction and miniaturization of the optical system, is a conditional expression on the ratio of the focal length of the first lens to the focal length of the entire optical system.

When deviating from a lower limit of Conditional Expression 1, it is difficult to correct spherical aberration since the refractive power of the first lens is increased, and when deviating from an upper limit of Conditional Expression 1, it is difficult to satisfy miniaturization of the optical system although it is advantageous to aberration correction including spherical aberration.

$$V1 - V2 > 25 \qquad \text{[Conditional Expression 2]}$$

Here, V1 is an Abbe number of the first lens, and V2 is an Abbe number of the second lens.

Conditional Expression 2 is a condition on chromatic aberration correction, and it is possible to facilitate chromatic aberration correction by increasing the Abbe number of the first lens than the Abbe number of the second lens. At this time, when deviating from a lower limit of Conditional Expression 2, it is difficult to satisfy optical characteristics required in the present invention, that is, chromatic aberration correction characteristics since chromatic aberration is increased due to a decrease in the difference in variance.

$$F2/F < -0.50 \qquad \text{[Conditional Expression 3]}$$

Here, F2 is a focal length of the second lens, and F is a focal length of the entire optical system.

Conditional Expression 3, which is a condition on aberration correction and miniaturization of the optical system, is a conditional expression on the ratio of the focal length of the second lens to the focal length of the entire optical system.

When deviating from an upper limit of Conditional Expression 3, it is difficult to perform aberration correction since the negative refractive power of the second lens is excessively increased or decreased.

$$-50 < F3/F < -3 \qquad \text{[Conditional Expression 4]}$$

Here, F3 is a focal length of the third lens, and F is a focal length of the entire optical system.

Conditional Expression 4, which is a condition on aberration correction of the optical system, is a conditional expression on the ratio of the focal length of the third lens to the focal length of the entire optical system.

Here, when deviating from an upper limit and a lower limit of Conditional Expression 4, it is difficult to perform aberration correction due to a difficulty in maintaining the appropriate refractive power of the third lens.

$$0.5 < F4/F < 10.0 \qquad \text{[Conditional Expression 5]}$$

Here, F4 is a focal length of the fourth lens, and F is a focal length of the entire optical system.

Conditional Expression 5, which is a condition on aberration correction of the optical system, is a conditional expression on the ratio of the focal length of the fourth lens to the focal length of the entire optical system.

Here, when deviating from an upper limit and a lower limit of Conditional Expression 5, it is difficult to perform aberration correction since the positive refractive power of the fourth lens is excessively increased or decreased.

$$0.8 < OAL/F < 1.4 \qquad \text{[Conditional Expression 6]}$$

Here, OAL is a distance from the object-side surface of the first lens to the image plane, and F is a focal length of the entire optical system.

Conditional Expression 6, which is a condition on miniaturization of the optical system, is a conditional expression on the ratio of the focal length to the total length of the entire optical system.

Here, when deviating from an upper limit of Conditional Expression 6, it is difficult to implement miniaturization of the entire optical system, and when deviating from a lower limit of Conditional Expression 6, it is impossible to secure an effective viewing angle of the optical system.

$$R1/F > 0.35 \qquad \text{[Conditional Expression 7]}$$

Here, R1 is a radius of curvature of the object-side surface of the first lens, and F is a focal length of the entire optical system.

Conditional Expression 7, which is a condition on shape design of the optical system, is a conditional expression on the ratio of the radius of curvature of the object-side surface of the first lens to the focal length of the entire optical system.

Here, when deviating from a lower limit of Conditional Expression 7, it is sensitive to tolerances when designing and assembling the first lens as the radius of curvature of the first lens is reduced.

$R4/F>30$ [Conditional Expression 8]

Here, R4 is a radius of curvature of the upper surface of the second lens, and F is a focal length of the entire optical system.

Conditional Expression 8, which is a condition on aberration correction of the optical system, is a conditional expression on the ratio of the radius of curvature of the upper surface of the second lens to the focal length of the entire optical system.

Here, when satisfying the condition within a lower limit of Conditional Expression 8, it is possible to facilitate aberration correction by appropriately maintaining the negative refractive power of the second lens.

$F2/F3>0.01$ [Conditional Expression 9]

Here, F2 is a focal length of the second lens, and F3 is a focal length of the third lens.

Conditional Expression 9, which is a condition on aberration correction of the optical system, is a conditional expression on the focal length of the second lens and the third lens.

Here, when deviating from a lower limit of Conditional Expression 9, it is difficult to perform aberration correction since the negative refractive power of the second lens is excessively increased and aberration characteristics are deteriorated.

$D1/F<0.03$ [Conditional Expression 10]

Here, D1 is an air gap between the first lens and the second lens, and F is a focal length of the entire optical system.

Conditional Expression 10, which is a condition on longitudinal aberration correction of the optical system, is a conditional expression on the distance between the first and second lenses to the focal length of the entire optical system.

Here, when deviating from an upper limit of Conditional Expression 10, longitudinal aberration characteristics of the entire optical system are deteriorated.

Hereinafter, a compact wide-angle optical system in accordance with the present invention will be described in detail with reference to specific numerical embodiments.

As described above, all of the following first to third embodiments include a first lens L1 having a positive refractive power and an object-side surface convex toward an object side; a second lens L2 having a negative refractive power and an image-side surface concave toward an image side; a third lens L3 having a negative refractive power; a fourth lens L4 having a positive refractive power; a fifth lens L5 having a positive refractive power and an image-side surface convex toward the image side; and a sixth lens L6 having a negative refractive power and an image-side surface concave toward the image side, and an optical filter OF, which is formed of an infrared filter or a cover glass coated with the infrared filter, is provided between the sixth lens L6 and an image plane 15.

Further, the first to sixth lenses L1 to L6 are formed of plastic lenses whose both surfaces are aspherical surfaces.

Meanwhile, an aspherical surface used in each of the following embodiments is obtained from known Equation 1, and E and a number following the E used in a Conic constant K and aspherical coefficients A, B, C, D, E, and F represent a 10's power. For example, E+02 represents $10^2$, and E-02 represents $10^{-2}$.

$$Z = \frac{cY^2}{1+\sqrt{1-(1+K)c^2Y^2}} + AY^4 + BY^6 + CY^8 + DY^{10} + EY^{12} + FY^{14} + \ldots \quad [\text{Equation 1}]$$

Here, Z: distance from vertex of lens in the direction of optical axis

Y: distance in the direction perpendicular to optical axis c: reciprocal of radius of curvature (r) at vertex of lens K: Conic constant A, B, C, D, E, F: aspherical coefficients First Embodiment The following Table 1 shows numerical examples according to the first embodiment of the present invention.

Figure 2:
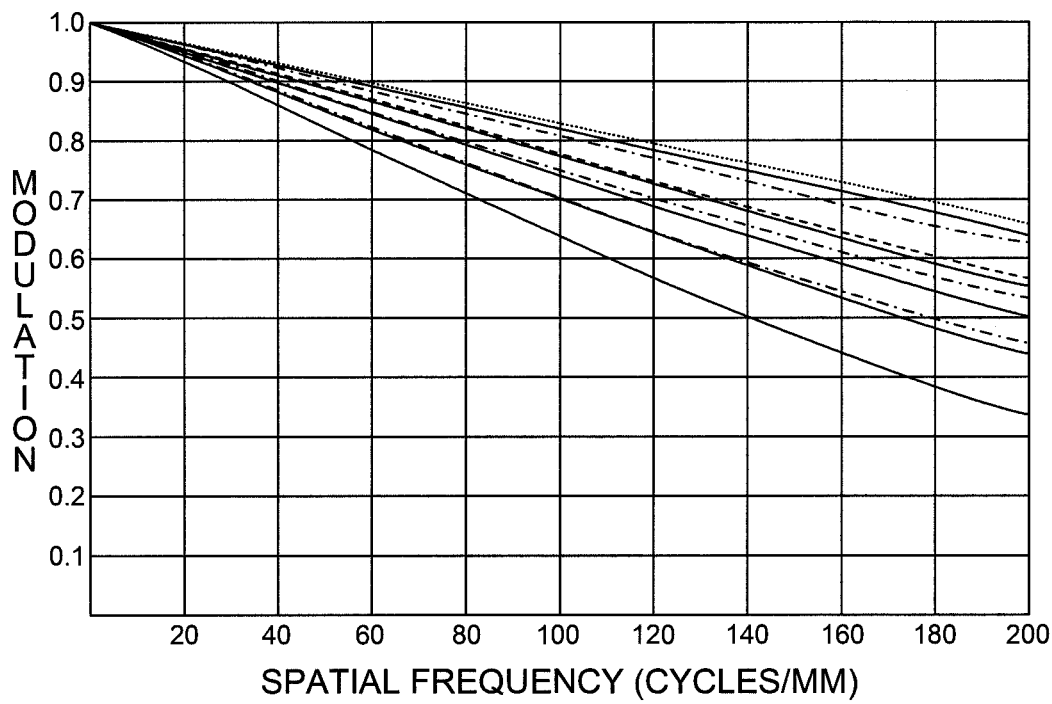
FIG. 2 is an MTF graph of the optical system shown in FIG. 1.
Figure 3:
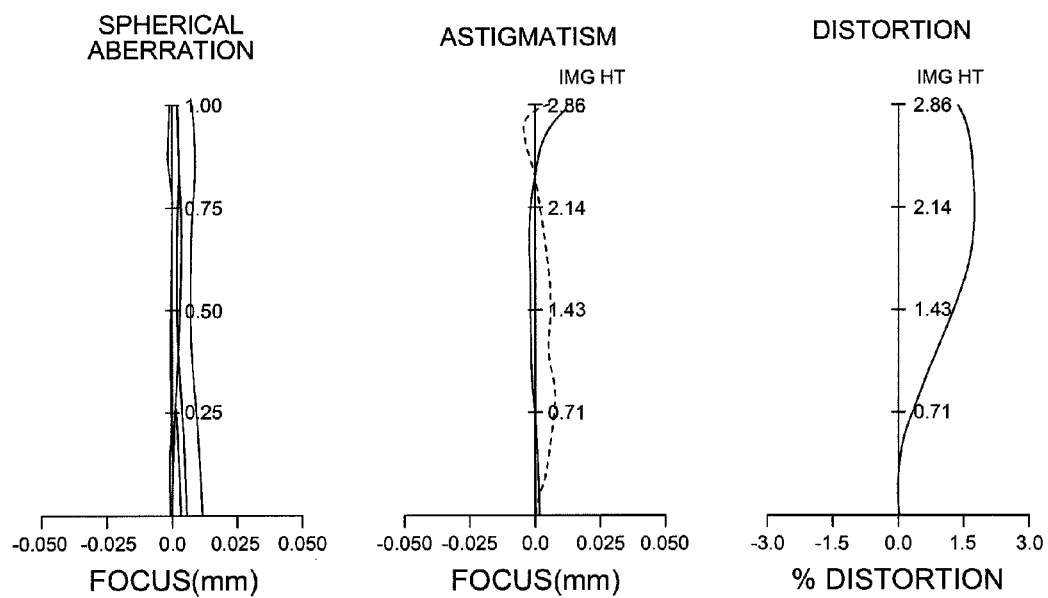
FIG. 3 is a diagram of aberration of the optical system shown in Table 1 and FIG. 1.

Further, FIG. 1 is a configuration diagram showing lens arrangement of an optical system for cameras in accordance with the first embodiment of the present invention, FIG. 2 is an MTF graph of the optical system shown in FIG. 1, and FIG. 3 is a diagram of aberration of the optical system shown in Table 1 and FIG. 1.

In the first embodiment, an effective focal length F of the entire optical system is 4.306 mm. Further, all of the first to sixth lenses L1 to L6 are aspherical plastic lenses.

Further, a focal length F1 of the first lens employed in the first embodiment is 3.105 mm, a focal length F2 of the second lens is 31 4.708 mm, a focal length F3 of the third lens is −137.521 mm, and a focal length F4 of the fourth lens is 37.815 mm.

And, a distance OAL from the object-side surface of the first lens employed in the first embodiment to the image plane is 5.549 mm, and an air gap D1 between the first lens and the second lens is 0.105 mm.

TABLE 1

| Surface No. | Radius of Curvature (R) | Thickness (mm) | Refractive Index (n) | Abbe Number (ν) | Remarks |
|---|---|---|---|---|---|
| *1 | 1.9483 | 0.649 | 1.547 | 56.1 | First lens |
| *2 | −11.5949 | 0.105 | | | |
| *3 | 4.1658 | 0.300 | 1.639 | 23.4 | Second lens |
| *4 | 1.6978 | 0.320 | | | |
| *5 | 107.8343 | 0.300 | 1.639 | 23.4 | Third lens |
| *6 | 48.3653 | 0.100 | | | |
| *7 | 19.1725 | 0.401 | 1.547 | 56.1 | Fourth lens |
| *8 | 263.3620 | 0.399 | | | |
| *9 | −2.5449 | 0.720 | 1.547 | 56.1 | Fifth lens |
| *10 | −0.9846 | 0.100 | | | |
| *11 | 7.9794 | 0.682 | 1.547 | 56.1 | Sixth lens |
| *12 | 1.1624 | 0.326 | | | |
| 13 | ∞ | 0.300 | 1.519 | 64.2 | Optical filter |
| 14 | ∞ | 0.848 | | | |

In Table 1, the sign * in front of the surface No. represents an aspherical surface. In the first embodiment, both surfaces of the first to sixth lenses L1 to L6 are aspherical surfaces.

Further, values of aspherical coefficients of the first embodiment by Equation 1 are as in the following Table 2.

TABLE 2

| Surface No. | Y diameter | K | A | B | C | D | E |
|---|---|---|---|---|---|---|---|
| 1 | 1.948 | 0.000 | 0.000 | −0.019 | 0.024 | −0.021 | 0.000 |
| 2 | −11.595 | 0.000 | −0.052 | 0.144 | −0.165 | 0.053 | 0.000 |
| 3 | 4.166 | 0.000 | −0.180 | 0.353 | −0.356 | 0.148 | −0.009 |
| 4 | 1.698 | 0.000 | −0.186 | 0.281 | −0.238 | 0.086 | 0.000 |
| 5 | 107.834 | 0.000 | −0.031 | −0.007 | −0.002 | −0.004 | 0.000 |
| 6 | 48.365 | 0.000 | −0.009 | −0.006 | −0.004 | 0.000 | 0.000 |
| 7 | 19.172 | 0.000 | −0.074 | 0.033 | 0.006 | −0.006 | 0.000 |
| 8 | 263.362 | 0.000 | −0.067 | 0.043 | −0.015 | 0.001 | 0.000 |
| 9 | −2.545 | −4.386 | −0.047 | 0.058 | −0.034 | 0.011 | −0.002 |
| 10 | −0.985 | −3.416 | −0.094 | 0.069 | −0.032 | 0.011 | −0.001 |
| 11 | 7.979 | 0.000 | −0.038 | −0.001 | −0.004 | −0.001 | 0.000 |
| 12 | 1.162 | −6.557 | −0.042 | 0.009 | −0.002 | 0.000 | 0.000 |

Second Embodiment

The following Table 3 shows numerical examples according to the second embodiment of the present invention.

Figure 4:
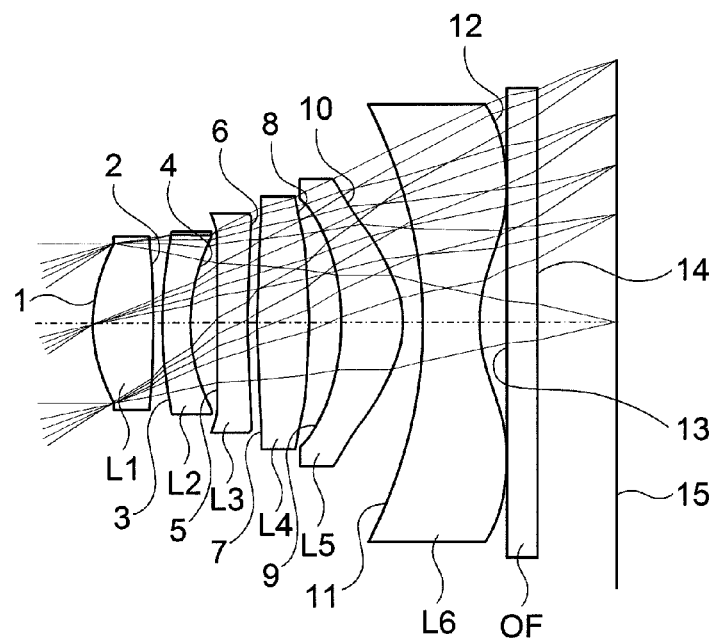
FIG. 4 is a configuration diagram showing lens arrangement of an optical system for cameras in accordance with a second embodiment of the present invention.
Figure 5:
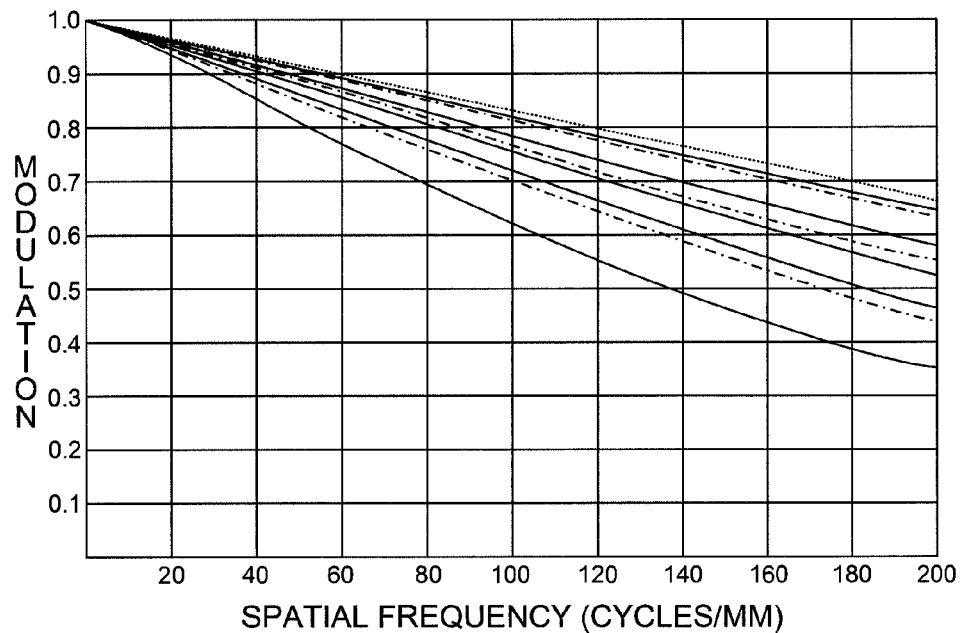
FIG. 5 is an MTF graph of the optical system shown in FIG. 4.
Figure 6:
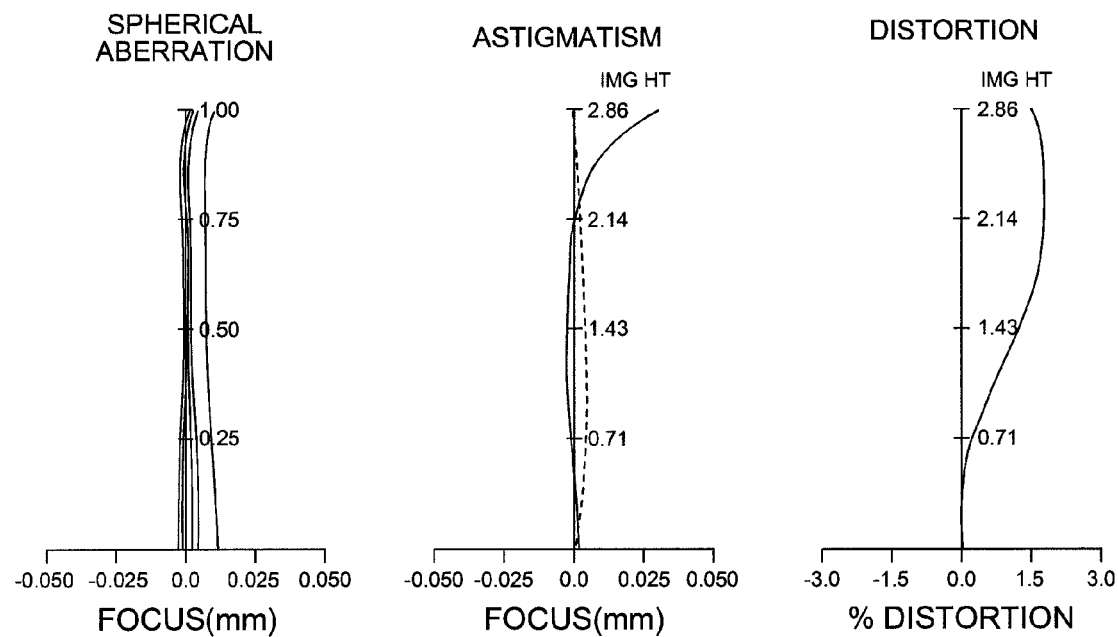
FIG. 6 is a diagram of aberration of the optical system shown in Table 3 and FIG. 4.

Further, FIG. 4 is a configuration diagram showing lens arrangement of an optical system for cameras in accordance with the second embodiment of the present invention, FIG. 5 is an MTF graph of the optical system shown in FIG. 4, and FIG. 6 is a diagram of aberration of the optical system shown in Table 3 and FIG. 4.

In the second embodiment, an effective focal length F of the entire optical system is 4.250 mm. Further, all of the first to sixth lenses L1 to L6 are aspherical plastic lenses.

Further, a focal length F1 of the first lens employed in the second embodiment is 3.600 mm, a focal length F2 of the second lens is −5.182 mm, a focal length F3 of the third lens is −46.921 mm, and a focal length F4 of the fourth lens is 6.869 mm.

And, a distance OAL from the object-side surface of the first lens employed in the second embodiment to the image plane is 5.609 mm, and an air gap D1 between the first lens and the second lens is 0.109 mm.

TABLE 3

| Surface No. | Radius of Curvature (R) | Thickness (mm) | Refractive Index (n) | Abbe Number | Remarks |
|---|---|---|---|---|---|
| *1 | 2.0320 | 0.593 | 1.547 | 56.1 | First lens |
| *2 | −55.8755 | 0.109 | | | |
| *3 | 3.7856 | 0.300 | 1.639 | 23.4 | Second lens |
| *4 | 1.7117 | 0.286 | | | |
| *5 | 3.8935 | 0.354 | 1.639 | 23.4 | Third lens |
| *6 | 3.3238 | 0.100 | | | |
| *7 | 13.9523 | 0.576 | 1.547 | 56.1 | Fourth lens |
| *8 | −5.0612 | 0.349 | | | |
| *9 | −1.7112 | 0.632 | 1.547 | 56.1 | Fifth lens |
| *10 | −0.9824 | 0.100 | | | |
| *11 | 5.4508 | 0.739 | 1.547 | 56.1 | Sixth lens |
| *12 | 1.1514 | 0.323 | | | |
| 13 | ∞ | 0.300 | 1.519 | 64.2 | Optical filter |
| 14 | ∞ | 0.848 | | | |

In Table 3, the sign * in front of the surface No. represents an aspherical surface. In the second embodiment, both surfaces of the first to sixth lenses L1 to L6 are aspherical surfaces.

Further, values of aspherical coefficients of the second embodiment by Equation 1 are as in the following Table 4.

TABLE 4

| Surface No. | Y diameter | K | A | B | C | D | E |
|---|---|---|---|---|---|---|---|
| 1 | 2.032 | 0.000 | −0.000 | −0.017 | 0.022 | −0.020 | 0.000 |
| 2 | −55.876 | 0.000 | −0.051 | 0.129 | −0.153 | 0.049 | 0.000 |
| 3 | 3.786 | 0.000 | −0.150 | 0.324 | −0.337 | 0.137 | −0.008 |
| 4 | 1.712 | 0.000 | −0.185 | 0.292 | −0.251 | 0.087 | 0.000 |
| 5 | 3.893 | 0.000 | −0.152 | 0.038 | −0.016 | 0.001 | 0.000 |
| 6 | 3.324 | 0.000 | −0.115 | 0.023 | −0.013 | 0.006 | 0.000 |
| 7 | 13.952 | 0.000 | −0.032 | 0.012 | 0.003 | −0.001 | 0.000 |
| 8 | −5.061 | 0.000 | −0.014 | 0.015 | −0.001 | −0.002 | 0.000 |
| 9 | −1.711 | −4.670 | −0.042 | 0.054 | −0.034 | 0.011 | −0.002 |
| 10 | −0.982 | −3.188 | −0.081 | 0.062 | −0.033 | 0.012 | −0.002 |
| 11 | 5.451 | 0.000 | −0.071 | 0.004 | 0.003 | −0.001 | 0.000 |
| 12 | 1.151 | −6.364 | −0.044 | 0.009 | −0.002 | 0.000 | 0.000 |

Third Embodiment

The following Table 5 shows numerical examples according to the third embodiment of the present invention.

Figure 7:
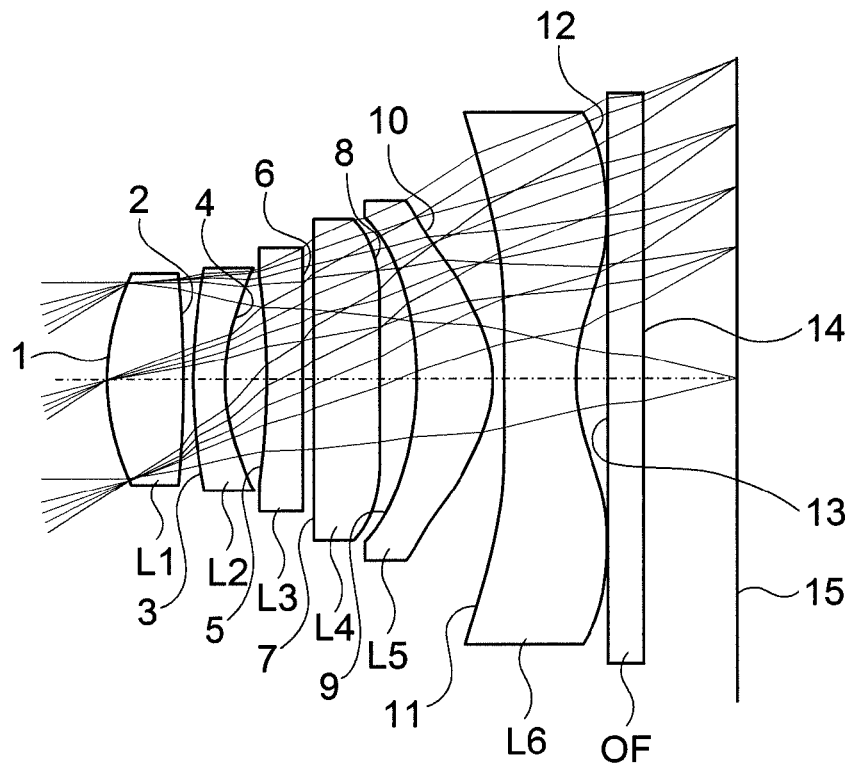
FIG. 7 is a configuration diagram showing lens arrangement of an optical system for cameras in accordance with a third embodiment of the present invention.
Figure 8:
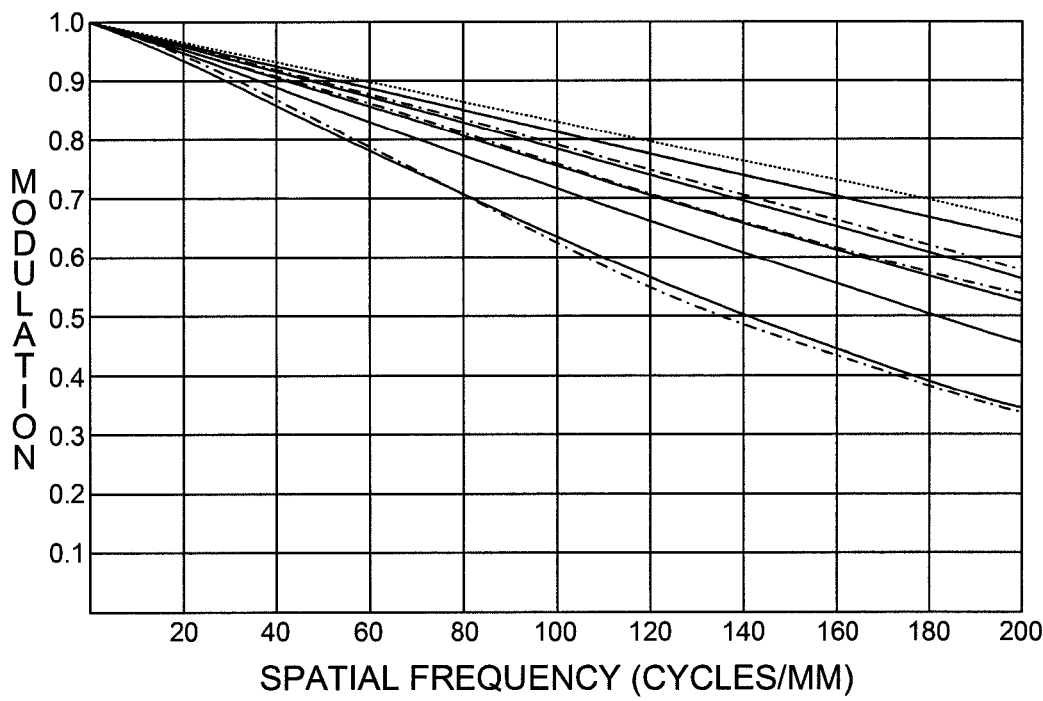
FIG. 8 is an MTF graph of the optical system shown in FIG. 7.
Figure 9:
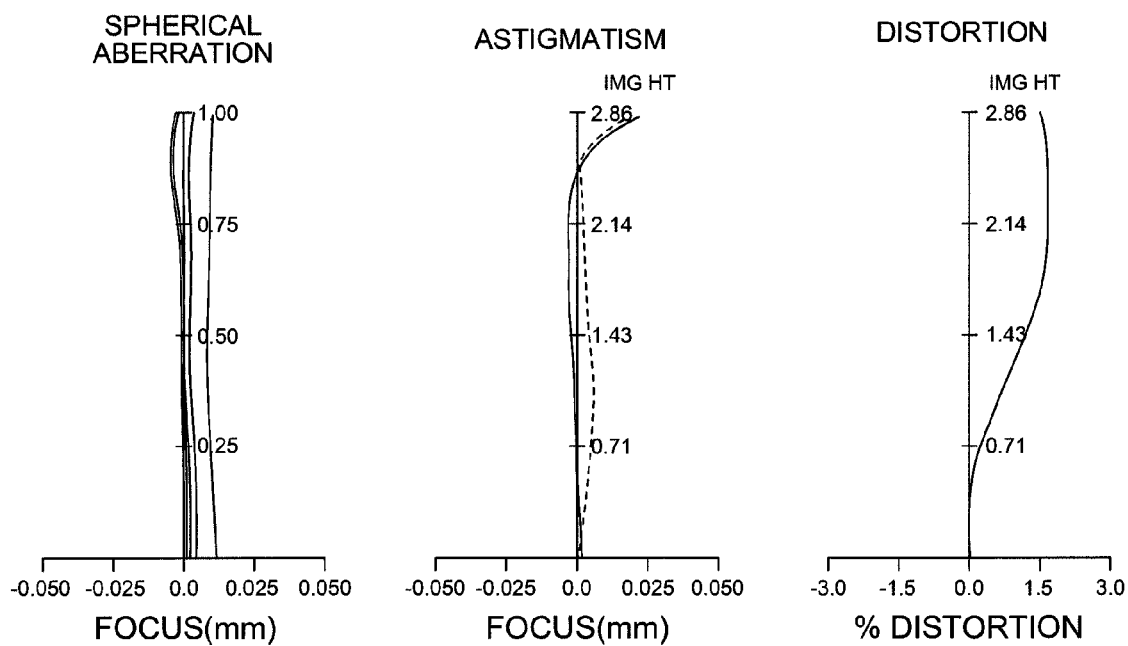
FIG. 9 is a diagram of aberration of the optical system shown in Table 5 and FIG. 7.

Further, FIG. 7 is a configuration diagram showing lens arrangement of an optical system for cameras in accordance with the third embodiment of the present invention, FIG. 8 is an MTF graph of the optical system shown in FIG. 7, and FIG. 9 is a diagram of aberration of the optical system shown in Table 5 and FIG. 7.

In the third embodiment, an effective focal length F of the entire optical system is 4.325 mm. Further, all of the first to sixth lenses L1 to L6 are aspherical plastic lenses.

Further, a focal length F1 of the first lens employed in the third embodiment is 3.117 mm, a focal length F2 of the second lens is −4.626 mm, a focal length F3 of the third lens is −42.559 mm, and a focal length F4 of the fourth lens is 19.868 mm.

And, a distance OAL from the object-side surface of the first lens employed in the third embodiment to the image plane is 5.557 mm, and an air gap D1 between the first lens and the second lens is 0.105 mm

TABLE 5

| Surface No. | Radius of Curvature (R) | Thickness (mm) | Refractive Index (n) | Abbe Number (v) | Remarks |
|---|---|---|---|---|---|
| *1 | 1.9643 | 0.663 | 1.547 | 56.1 | First lens |
| *2 | −11.3100 | 0.105 | | | |
| *3 | 4.8687 | 0.304 | 1.639 | 23.4 | Second lens |
| *4 | 1.7946 | 0.334 | | | |
| *5 | −18.8137 | 0.300 | 1.639 | 23.4 | Third lens |
| *6 | −98.9956 | 0.100 | | | |
| *7 | 8.2783 | 0.606 | 1.547 | 56.1 | Fourth lens |
| *8 | 33.9398 | 0.334 | | | |
| *9 | −2.9524 | 0.658 | 1.547 | 56.1 | Fifth lens |
| *10 | −0.9459 | 0.100 | | | |
| *11 | 9.5131 | 0.604 | 1.547 | 56.1 | Sixth lens |
| *12 | 1.0402 | 0.320 | | | |
| 13 | ∞ | 0.300 | 1.519 | 64.2 | Optical filter |
| 14 | ∞ | 0.850 | | | |

In Table 5, the sign * in front of the surface No. represents an aspherical surface. In the third embodiment, both surfaces of the first to sixth lenses L1 to L6 are aspherical surfaces.

Further, values of aspherical coefficients of the third embodiment by Equation 1 are as in the following Table 6.

TABLE 6

| Surface No. | Y diameter | K | A | B | C | D | E |
|---|---|---|---|---|---|---|---|
| 1 | 1.964 | 0.000 | 0.000 | −0.018 | 0.023 | −0.020 | 0.000 |
| 2 | −11.310 | 0.000 | −0.047 | 0.134 | −0.158 | 0.050 | 0.000 |
| 3 | 4.869 | 0.000 | −0.171 | 0.349 | −0.361 | 0.147 | −0.008 |
| 4 | 1.795 | 0.000 | −0.185 | 0.296 | −0.245 | 0.085 | 0.000 |
| 5 | −18.814 | 0.000 | −0.067 | 0.058 | −0.008 | −0.012 | 0.000 |
| 6 | −98.996 | 0.000 | −0.023 | 0.039 | −0.020 | 0.003 | 0.000 |
| 7 | 8.278 | 0.000 | −0.037 | 0.000 | 0.002 | 0.001 | 0.000 |
| 8 | 33.940 | 0.000 | −0.032 | −0.002 | −0.003 | −0.002 | 0.000 |
| 9 | −2.952 | −12.956 | −0.052 | 0.049 | −0.035 | 0.010 | −0.002 |
| 10 | −0.946 | −3.716 | −0.091 | 0.066 | −0.033 | 0.011 | −0.001 |
| 11 | 9.513 | 0.000 | −0.058 | 0.000 | 0.004 | −0.001 | 0.000 |
| 12 | 1.040 | −6.386 | −0.049 | 0.011 | −0.002 | 0.000 | 0.000 |

Meanwhile, values of Conditional Expressions for the first to fourth embodiments are as in the following Table 7.

TABLE 7

|  | Embodiment 1 | Embodiment 2 | Embodiment 3 |
|---|---|---|---|
| F1/F | 0.721 | 0.847 | 0.721 |
| V1 − V2 | 32.7 | 32.7 | 32.7 |
| F2/F | −1.093 | −1.219 | −1.070 |
| F3/F | −31.936 | −11.040 | −9.841 |
| F4/F | 8.782 | 1.616 | 4.594 |
| OAL/F | 1.289 | 1.320 | 1.290 |
| R1/F | 0.452 | 0.478 | 0.454 |
| R4/F | 0.394 | 0.403 | 0.415 |
| F2/F3 | 0.034 | 0.110 | 0.109 |
| D1/F | 0.024 | 0.026 | 0.024 |

As described above, the optical system in accordance with the present invention can improve aberration correction efficiency and reduce manufacturing costs by forming six lenses with aspherical plastic lenses and implement high resolution by minimizing chromatic aberration.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. An optical system comprising:
   a first lens having a positive refractive power and an object-side surface convex toward an object side;
   a second lens having a negative refractive power and an image-side surface concave toward an image side;
   a third lens having a negative refractive power;
   a fourth lens having a positive refractive power and an object-side surface convex toward an object side;
   a fifth lens having a positive refractive power of which an object-side surface is concave and an image-side surface is convex; and
   a sixth lens having a negative refractive power and an image-side surface concave toward the image side,
   wherein the optical system satisfies the following Conditional Expression with respect to conditions on aberration correction;

$$-50 < F3/F < -3,\quad \text{[Conditional Expression]}$$

where F3 is a focal length of the third lens, and F is a local length of the entire optical system.

2. The optical system according to claim 1, wherein the optical system satisfies the following Conditional Expression with respect to conditions on aberration correction and miniaturization design:

$$0.5 < F1/F < 1.2,\quad \text{[Conditional Expression]}$$

where F is the focal length of the entire optical system, and F1 is a focal length of the first lens.

3. The optical system according to claim 1, wherein the optical system satisfies the following Conditional Expression with respect to conditions on chromatic aberration:

$$V1 - V2 > 25,\quad \text{[Conditional Expression]}$$

where V1 is an Abbe number of the first lens, and V2 is an Abbe number of the second lens.

4. The optical system according to claim 1, wherein the optical system satisfies the following Conditional Expression with respect to conditions on aberration correction and miniaturization:

$$F2/F < -0.50,\quad \text{[Conditional Expression]}$$

where F2 is a focal length of the second lens, and F is the focal length of the entire optical system.

5. The optical system according to claim 1, wherein the optical system satisfies the following Conditional Expression with respect to conditions of aberration correction:

$$0.5 < F4/F < 10.0,\quad \text{[Conditional Expression]}$$

where F4 is a focal length of the fourth lens, and F is the focal length of the entire optical system.

6. The optical system according to claim 1, wherein the optical system satisfies the following Conditional Expression with respect to conditions on miniaturization:

$$0.8 < OAL/F < 1.4,\quad \text{[Conditional Expression]}$$

where OAL is a distance from the object-side surface of the first lens to an image plane, and F is the focal length of the entire optical system.

7. The optical system according to claim 1, wherein the optical system satisfies the following Conditional Expression with respect to conditions on shape design:

$$R1/F > 0.35,\quad \text{[Conditional Expression]}$$

where R1 is a radius of curvature of the object-side surface of the first lens, and F is the focal length of the entire optical system.

8. The optical system according to claim 1, wherein the optical system satisfies the following Conditional Expression with respect to conditions on aberration correction:

$$R4/F > 0.3,\quad \text{[Conditional Expression]}$$

where R4 is a radius of curvature of the upper surface of the second lens, and F is the focal length of the entire optical system.

9. The optical system according to claim 1, wherein the optical system satisfies the following Conditional Expression with respect to conditions on aberration correction:

$$F2/F3 > 0.01,\quad \text{[Conditional Expression]}$$

where F2 is a focal length of the second lens, and F3 is the focal length of the third lens.

10. The optical system according to claim 1, wherein the optical system satisfies the following Conditional Expression with respect to conditions on longitudinal aberration correction:

$$D1/F < 0.03,\quad \text{[Conditional Expression]}$$

where D1 is an air gap between the first lens and the second lens, and F is the focal length of the entire optical system.

11. The optical system according to claim 1, wherein the first to sixth lenses are plastic lenses.

12. The optical system according to claim 1, wherein both surfaces of the first to sixth lenses are aspherical surfaces.

13. The optical system according to claim 1, further comprising:
   an optical filter provided between the six lens and an image plane and formed of a cover glass coated with an infrared cut filter for blocking excessive infrared rays included in light introduced from the outside.

* * * * *